A. McGARY.
ELECTRICAL SYSTEM OF DISTRIBUTION.
APPLICATION FILED JAN. 26, 1914.

1,239,710.

Patented Sept. 11, 1917.
2 SHEETS—SHEET 1.

WITNESSES

INVENTOR
Alexander McGary
BY
ATTORNEYS

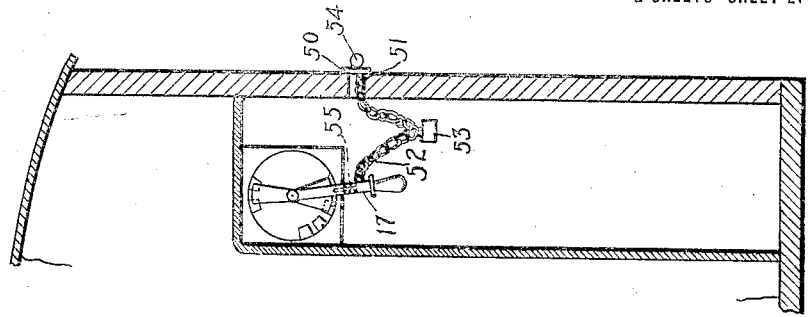
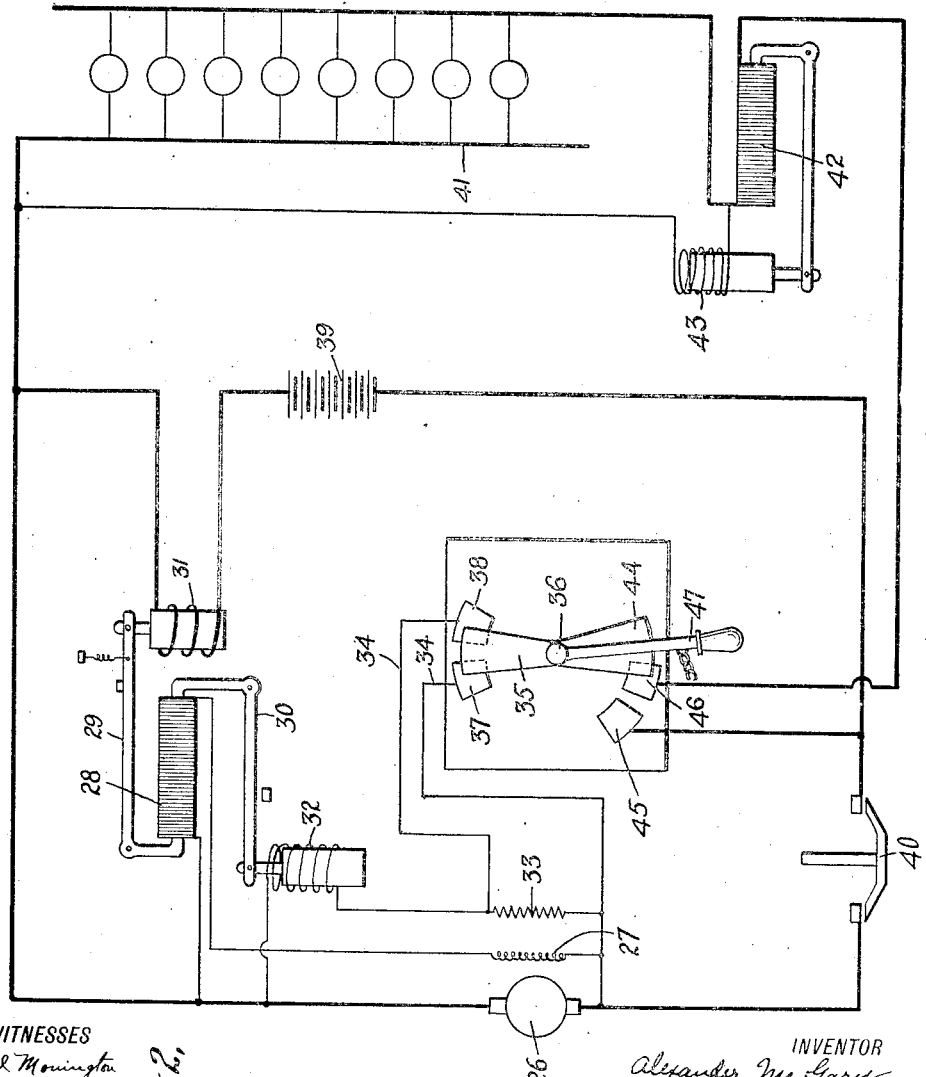

UNITED STATES PATENT OFFICE.

ALEXANDER McGARY, OF NEW YORK, N. Y., ASSIGNOR TO GOULD COUPLER COMPANY, A CORPORATION OF NEW YORK.

ELECTRICAL SYSTEM OF DISTRIBUTION.

1,239,710.  Specification of Letters Patent.  Patented Sept. 11, 1917.

Application filed January 26, 1914. Serial No. 814,434.

*To all whom it may concern:*

Be it known that I, ALEXANDER McGARY, a citizen of the United States, and a resident of the borough of Bronx, city, county, and State of New York, have invented certain new and useful Improvements in Electrical Systems of Distribution, of which the following is a specification.

My invention relates to improvements in electrical systems of distribution and more particularly to car lighting systems in which a generator is driven at a variable speed to feed a storage battery and work or lamp circuit for lighting the car. With some systems of this general class it has been found that when applied to cars which have exceptionally long runs and in which while so running lights are not being used, as in the case of baggage or express cars which run for long distances and are sealed up during the entire trip, the battery not only becomes fully charged, but because of the voltage regulation of the generator it continues to receive a small charging current even after substantially charged, which gasses the battery, evaporating the electrolyte, so that after an extremely short time the battery has entirely given out and it has been found necessary to replace such batteries long before their usual term of life has been reached.

The main object of my invention is to provide an arrangement by which these disadvantages may be efficiently and satisfactorily overcome. Further objects, features and advantages will more clearly appear from the detailed description given below taken in connection with the accompanying drawings which form a part of this specification.

In the drawings,

Fig. 2 is a diagram showing my improvements applied to a modified system; and

Fig. 3 is a detail of the arrangement of my improved switch apparatus in the car.

Figure 1:
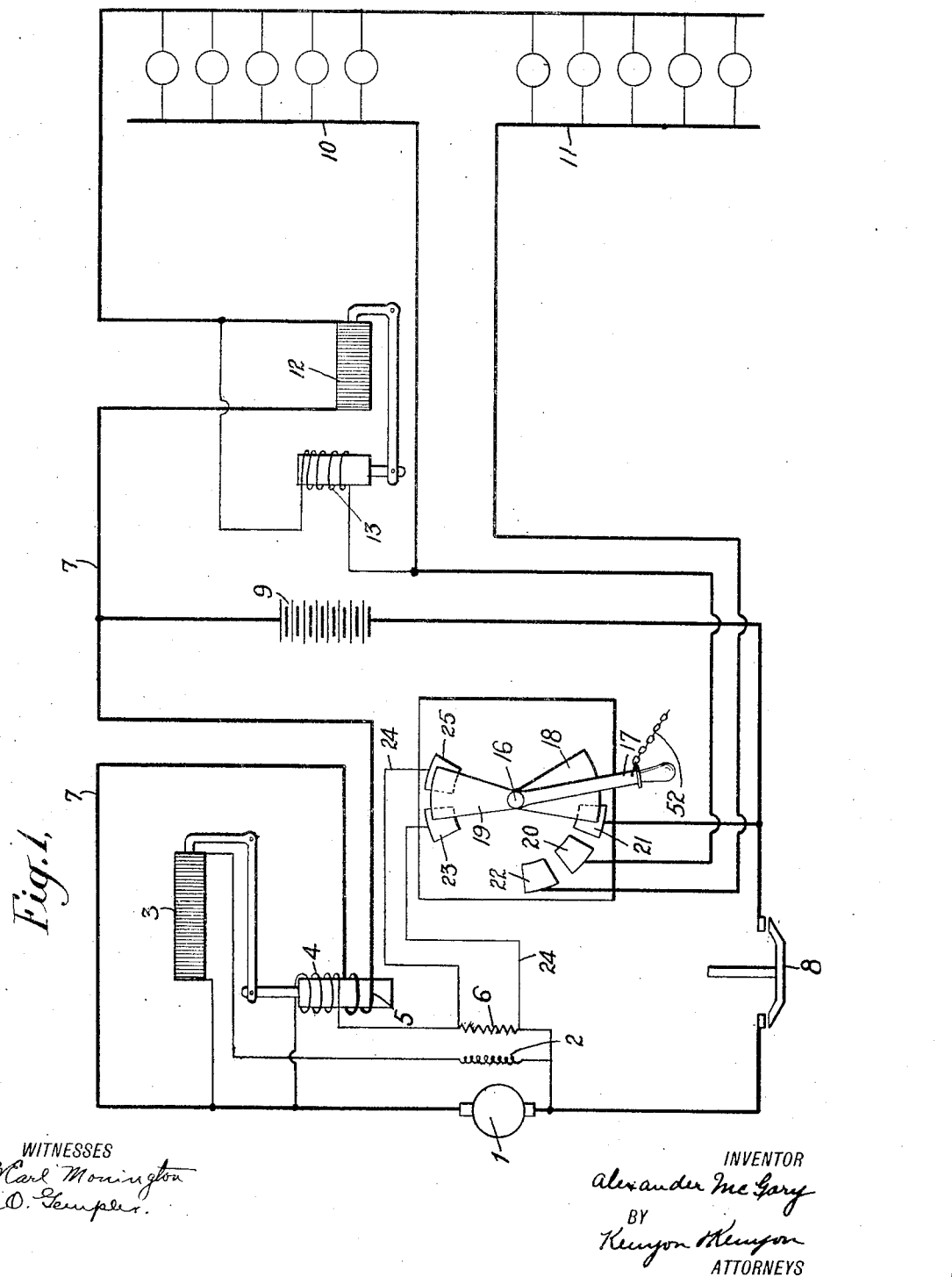
Figure 1 is a diagram of the system embodying my improvements in one form.

Referring to Fig. 1, 1 represents the main generator adapted to be driven at a variable speed, as from the car axle. 2 represents a shunt field therefor adapted to be regulated by a carbon pile resistance 3 in series therewith, which carbon pile is controlled by a solenoid having a voltage coil 4 and a current coil 5 to operate the resistance 3 to regulate the voltage of the generator. The voltage coil 4 has in series therewith a fixed resistance 6 and the current coil 5 is connected in series in the mains 7 of the generator. 8 represents a main switch of any suitable kind, adapted to connect the generator with the battery and work circuits when the generator shall have attained sufficient speed. 9 represents a storage battery, and 10 and 11, two work circuits adapted to be connected across the generator to be fed thereby. The voltage of the work circuits is regulated by a carbon pile 12 in series therewith, which is controlled by a voltage solenoid 13 connected across the work circuit 10.

16 represents a switch provided with an operating handle 17 carrying two switch blades 18 and 19. Upon throwing the handle 17 to the left the blade 18 electrically connects two contacts 20 and 21, thereby connecting the work circuit 10 to the generator. Upon a further throw of the handle the blade 18 also engages a contact 22 thereby connecting the work circuit 11 to the generator in addition to the work circuit 10, the blade 18 being wide enough to bridge all three contacts 20, 21, and 22. However, as soon as the blade 18 is moved to engage the contacts 20 the blade 19 is moved out of contact with a contact 23 so as to open a shunt circuit 24 about the resistance 6, which shunt circuit has previously been closed by the engagement of the blade 19 with both the contacts 23 and 25.

In operation, when the generator has attained a sufficient speed the main switch 8 is closed, thus connecting the battery in circuit with the generator and also connecting in circuit with the generator either or both of the lamp circuits, if they be turned on. The current supplied by the generator is limited by the coil 5 in a well known manner until the battery has become substantially charged when the strength of coil 4 will be so increased that the voltage of the generator 1 will be limited thereby so that the current gradually tapers off until substantially no charging current passes through the battery.

In many cars such as above described, where the car undergoes long runs without using any light, or using very little light, the battery will remain practically charged and will tend to gas and become disintegrated. In order to prevent this excessive gassing of the batteries during such long runs when the lamp circuits are turned off the switch 16 is adjusted to open-circuit the shunt 24 when the lamps are turned on so as to thereby insert the resistance 6 in circuit with the voltage coil 4, thereby requiring a greater voltage across the generator in order to maintain the system in equilibrium. However, when the lamps are turned off the resistance 6 is shunted, thereby allowing the coil 4 to produce the same effect on the carbon pile 3 with a much less generator voltage, so that when the lamps are turned off the voltage of the generator is decreased by say two to four volts, so as to entirely eliminate any small charging current going to the battery which might cause a gassing of the cells and thus gradually destroy their usefulness. It will be noted that as soon as either or both of the work circuits are turned on by means of the switch 16 the resistance 6 is thrown in circuit with the coil 4 so as to cause an increase of the generator voltage sufficient to fully charge the battery and to desulfate the battery if it shall have become sulfated because of long standing.

Much the same arrangement is shown in Fig. 2, in which the main generator is shown at 26 with its shunt field at 27 in series with the generator regulating carbon pile 28. In this modification, however, the carbon pile 28 is operated upon by two levers 29 and 30 controlled by a current coil 31 and a voltage coil 32, respectively. In this instance the coil 31 is placed in series with the battery to maintain substantially constant charging current. A fixed resistance 33 is placed in series with the coil 32 and is adapted to be shunted by a circuit 34 when the switch blade 35 of the switch 36 engages both of the contacts 37 and 38. The battery is shown at 39 and the main switch at 40. The work circuit is indicated at 41 and has in series therewith a carbon pile 42 to regulate its voltage, which pile is controlled by a voltage solenoid 43, in a well known manner. For the purpose of turning on or off the work circuit the switch 36 is provided with a switch blade 44 adapted to electrically connect contacts 45 and 46 upon a throwing of a switch by means of the handle 47. The coil 31 operates to maintain substantially constant charging current until the battery becomes charged, when the coil 32 will become so increased in strength that it will operate the carbon pile 28 to limit the voltage of the generator. As with the modification shown in Fig. 1, when the handle 47 is thrown to turn on the work or lamp circuit the shunt about the resistance 33 is opened, thereby necessitating a greater voltage across the generator in order to maintain equilibrium, and accordingly, when the lamp circuit is turned off by means of the switch and the coil 33 shunted the voltage of the generator is decreased, as explained in connection with Fig. 1.

In most cases the switch apparatus will be located in a locker or closet inside the car and in baggage cars where they are frequently loaded and then sealed for long trips it often happens that the attendants forget to leave space by which they may reach the switch and turn out the lights at the last moment, and in such case they are apt to leave the lights burning for the whole trip. In order, therefore, that the lights may be turned out in such cases, or may be turned out later in case the car starts on its journey without their being turned out, I provide, as shown in Fig. 3, an aperture 50 in the side of the car adapted to be closed by a plate 51 connected by means of a chain 52 with the handle 17. A weight 53 is suspended from the chain 52 in order to keep the same taut and thus pull the plate 51 up to the aperture 50 so that the aperture 50 will always be closed. The plate 51 is provided with a handle 54 by means of which the chain 52 may be pulled at any time from the outside of the car to operate the switch to turn off the lights and decrease the voltage of the generator, as above explained. In order that the weight 53 or the vibrations of the car will not move or operate the switch when not desired, the handle 17 is provided with a spring pressed dog 55 adapted to engage notches in the framework of the switch so as to keep the switch fixed in place except when it is given a positive pull by means of the handle 54 or the handle 17.

Although I have described my improvements in great detail and with respect to certain specific embodiments thereof, nevertheless I do not desire to be limited to such details except as clearly specified in the appended claims, since many changes and modifications may well be made without departing from the spirit and scope of my invention in its broader aspects.

Having fully and clearly described my improvements what I claim as new and desire to secure by Letters Patent, is:

1. An electrical system of distribution having in combination a generator driven at a variable speed, a storage battery and work circuit connected to be fed thereby, generator regulating means including a current coil for regulating the current from the generator and a voltage coil for limiting the voltage of the generator, and means for decreasing the limit to which the voltage coil holds the voltage of the generator, when the work circuit is turned off.

2. An electrical system of distribution having in combination a generator driven at a variable speed, a storage battery and work circuit connected to be fed thereby, generator regulating means including a current coil for regulating the current from the generator and a voltage coil for limiting the voltage of the generator, and means for decreasing the limit to which the voltage coil holds the voltage of the generator, when the work circuit is turned off, said last mentioned means embracing a switch for turning on and off the work circuit and means controlled by the switch for increasing the voltage at which said coil operates, when the work circuit is turned on by said switch.

3. An electrical system of distribution having in combination a generator, a storage battery and work circuit connected to be fed thereby, generator regulating means including a coil for limiting the voltage of the generator, and means for decreasing the limit to which the voltage coil holds the voltage of the generator, when the work circuit is turned off.

4. An electrical system of distribution having in combination a generator, a storage battery and work circuit connected to be fed thereby, generator regulating means including a coil for limiting the voltage of the generator, a switch for turning on and off the work circuit, and means controlled by the switch for altering the effect of said voltage coil to decrease the voltage of the generator when the work circuit is turned off.

5. A car lighting system having in combination with the car, a generator, a storage battery and work circuit connected to be fed by the generator, generator regulating means including a coil for limiting the voltage of the generator, a switch for turning on and off the work circuit and means controlled by the switch for altering the effect of said voltage coil to decrease the voltage of the generator when the work circuit is turned off, said switch being located inside the car, and means whereby the switch may be operated from outside the car to turn off the work circuit.

6. An electrical system of distribution, having in combination a generator, a storage battery and work circuit connected to be fed thereby, generator regulating means including a coil for limiting the voltage of the generator and means for decreasing the limit to which said coil holds the voltage of the generator when the work circuit is turned off to a point where it will prevent any gassing current to flow through the battery.

7. An electrical system of distribution, having in combination a generator, a storage battery and work circuit fed thereby, generator regulating means including a voltage coil for limiting the voltage of the generator, means for decreasing the limit at which the voltage coil holds the voltage of the generator when the work circuit is turned off to a point where it will prevent any material gassing current to flow through the battery.

In testimony whereof, I have signed my name to this specification, in the presence of two subscribing witnesses.

ALEXANDER McGARY.

Witnesses:
GORHAM CROSBY,
EDWIN SEGER.